2,904,455
HIGH TENSILE STRENGTH TEXTILE MATERIALS

Alois C. Baggenstoss and Consuelo P. Baggenstoss, Gastonia, N.C.

No Drawing. Application May 31, 1956
Serial No. 588,214

1 Claim. (Cl. 117—144)

This invention relates to and has for its object, the provision of a novel class of agents and compositions useful for improving the properties of natural and synthetic fibers and threads and the fabrics made therefrom. Another object of the invention is to provide methods for treating said fibers, threads and fabrics with the novel agents of the invention to obtain the improved properties, particularly in tensile strength.

Several attempts have been made heretofore to modify fabrics and fabric-forming materials in order to improve their physical characteristics, especially their tensile strength. In spite of the obvious importance of this property, the optimum improvement resulting from methods made public to date has been of the order of about 10%. According to the applicants' novel and significant concept, however, it is now possible to attain an increase in tensile strength of about 65% in fibers, threads and fabrics, especially in cotton and modified cellulose materials.

The agents of the invention are Diels-Alder condensates of abietic and dienophilic amines in which the carboxylic acid group of the abietic acid is usually treated to form an amide or an ester. Water-solubilizing groups are normally present in the final product and such solubilizing groups are preferably present in the amine or alcohol reactant used for formation of the amide or ester of the Diels-Alder condensation product. However, the water solubilizing group may alternatively or in addition be present in the dienophilic basic reactant used for the Diels-Alder condensation or in the abietic acid portion of the molecule.

Thus, the agents of the invention may be said to include those of the general formula

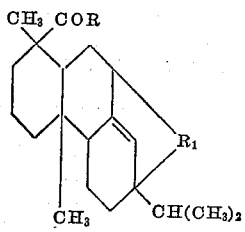

wherein R is the residue of a member of the class consisting of OH, amido and ester residues and $R_1$ is the residue of a basic-group-containing dienophilic compound. The residue $R_1$ may contain any inert substituents, lower alkyl, lower alkoxy (especially lower methoxy), halo (especially chloro or bromo), nitro, etc., and it may be derived from a carbocyclic, heterocyclic or aliphatic dienophilic basic compound. Preferably the compounds also contain water solubilizing groups.

As has been indicated above, the dienophilic basic compound which is utilized may be any one which will take part in the Diels-Alder condensation. Preferably the amine is a tertiary amine. However, primary and secondary amines may also be utilized. When the latter type (primary and secondary) amines are used in accordance with the procedure of the invention, it is found that the Diels-Alder condensation takes preference to reaction with the free carboxylic acid group of the abietic acid. Of course, if one desires to do so, one may block the free acid by any of the standard procedures (e.g. acetylation) to entirely preclude the possibility of any reaction with the acid and to insure the procurement of maximum yield. Since water solubility is advantageous in the agents of the invention, it is possible to utilize, as the dienophilic reactant, a base which contains such groups, particularly sulfonic acid groups; carboxylic acid or alcoholic hydroxyl groups may also be present in place of or in addition to the sulfonic acid groups. Among the types of amines useful in the invention are carbocyclic aromatic compounds containing an amino group. They may be and are preferably mononuclear carbocyclic such as dimethyl aniline; diethyl aniline; methyl ethyl aniline; diisopropyl aniline; di-(beta-hydroxyethyl)-aniline; di-methylaminoethyl aniline; methyl aniline; ethyl aniline; aniline; etc. Of the types of amines described above, the tertiary amino di-lower alkyl-substituted anilines are preferred, especially dimethyl aniline. The dienophilic reactant may also be a polycyclic carbocyclic aromatic base, such as a mono or di lower aliphatic (especially lower alkyl) naphthylamine (e.g. N,N-dimethyl naphthyl-amine; N,N-diethylnaphthylamine; N-methyl-N-ethyl naphthylamine; N,N - di(beta-hydroxyethyl) - naphthyl-amine or the primary naphthylamine; substituted anthracenes and phenanthrenes, such as amino anthracene; dimethylamino anthracene; dimethylamino phenanthrene, etc., may also be used. Polycyclic aromatic amines in which the rings are not condensed may likewise be used. Examples of such reactants are diphenylamine, N-methyl diphenylamine, N,N-dimethylamino biphenyl, etc. Any of the above type of compounds in hydrogenated form may also be used provided that one double bond is retained for the Diels-Alder reaction.

In addition to the above, heterocyclic basic compounds may be also used in the invention. Among such compounds are pyridine, pyrazine, pyridazine, quinoline, pyrimidine, cinnoline, phthalazine, quinozoline, acridine, phenazine, purine, etc. Hydrogenated derivatives of these heterocylic compounds may also be used provided that they retain at least one carbon to carbon double bond for the Diels-Alder condensation. Among the oxygen-containing heterocyclic compounds useful in the invention one may mention morpholine and furfurylamine as well as N-mono and N,N-disubstituted furfurylamines. Preferred are the N,N-disubstituted furfurylamines, especially the di-lower aliphatic and more specifically, the di-lower alkyl substituted furfurylamines. Examples of such compounds are dimethylamino furane, diethyl-amino furane, ethylamino furane, propylamino furane, methyl, ethylamino furane, etc. Among the sulfur-containing heterocyclic compounds useful in the invention one may include amino thiophene, as well as secondary and tertiary amine derivatives of amino thiophene, such as dimethylamino thiophene, methylamino thiophene, ethylamino thiophene, etc. The dihydrofurane and di-hydrothiophene derivatives of compounds of the type enumerated above may also be utilized.

Aminoalkenes and aminoalkynes may also be used in the invention with tertiary amino compounds being, of course, preferred. Especially preferred, are the amino-lower-alkenes and amino-lower-alkynes, particularly the di-lower alkylamino lower alkenes and alkynes. Among such aliphatic compounds are 1-amino-propene-2, 1-aminobutene-2, 1-aminobutene-3, 1-amino-butyne-3, 1-dimethylaminopropene-2, 1-diethylaminopropene-3, 1-di-isopropylaminobutene-3, etc.

The reactants which are used either in sulfonated or non-sulfonated form are known and can be prepared according to generally known methods.

Although it is preferred to use abietic acid, per se, in the reaction for maximum efficiency, materials containing the acid or having the ability to form that acid in situ (e.g. rosin) may be used.

The initial reaction of the Diels-Alder type is carried out preferably at room temperature; use of elevated temperatures is, however, not to be excluded. In the Diels-Alder reaction, it has been found advantageous to utilize, as a catalyst, a dehydrating material such as phosphorus trichloride. Also useful are those agents generally utilized for this purpose such as $P_2O_5$, $H_2SO_4$ (conc.), $H_3PO_4$ (conc.), $POCl_3$, $PCl_5$, $CCl_3COOH$, etc.

Any inert solvent (especially an inert organic solvent) may be utilized for the Diels-Alder condensation. Preferably the solvent is the amine which takes part in the Diels-Alder reaction. For example, when dimethyl aniline is used in the reaction, an excess of this reagent may be employed to serve as solvent. The solvent may also be one of the generally employed solvents, such as a xylene, toluene, chlorobenzene, nitrobenzene, ethylene dichloride, etc.

The proportions of the reactants used are not critical. However, for optimum yield, it is preferred to employ the amine reactant in an amount slightly greater than the stoichiometric amount needed. The amount of catalyst may also vary widely and, although it is desirable to use about ⅓ mol. catalyst (e.g. $PCl_3$) per mol. abietic acid, one may use from about 0.1 mol. to 1.0 mol. or more of catalyst per mol. abietic acid if one wishes to do so.

The Diels-Alder condensation products may be further condensed as indicated above, with alcohols or primary or secondary amines to form amides or esters. This subsequent condensation may be carried out in the manner generally used for such reactions. The amine or alcohol used for condensation with the carboxylic acid group of the abietic acid may be aliphatic, aromatic or heterocyclic. Preferably, the reactant will contain water solubilizing groups. Thus, among the amines useful are aliphatic amines especially sulfonated lower alkyl primary and secondary amine, carboxylated lower alkyl primary and secondary amines and hydroxy lower alkyl primary and secondary amines. Examples of such compounds are taurine, 4-aminobutane-1-sulfonic acid, 4-aminopentane-1-sulfonic acid, methyl taurine, omega amino valeric acid, hydroxyethylamine, glycine, alamine, serine, threonine, etc.; and aromatic amines, such as sulfonated or carboxylated aniline, methyl aniline, naphthylamine, toluidine, etc. Examples of heterocyclic amines useful for amidation are sulfonated or carboxylated furfurylamine, 2-amino thiophene, etc. As alcohols which may be condensed with the free carboxylic acid group of the abietic acid one may include alkanols (especially lower alkanols) such as ethanol, methanol, isopropanol, etc.; aliphatic polyols, especially diols (e.g. alkanediols, such as ethylene glycol, propylene glycol, butylene glycol, diethylene glycol, ethylene glycol monoethyl ether, polyethylene glycol) 2-aminoethanol, phenol, etc., and others. Generally, any primary or secondary amine or alcohol may be used for reaction with the carboxylic acid group found in the abietic acid.

For esterification, the Diels-Alder condensate may be heated directly with the desired alcohol in the presence of a dehydrating agent to remove the water formed during the condensation; or the acid may be converted to the acid halide which may then be treated with the desired alcohol in the presence of a hydrogen halide acceptor to form the ester.

One may react the esterified condensation product directly with the desired amine in the presence of a dehydrating agent; or one may treat the abietic acid derivative directly with the amine to form the amide (preferably in the presence of a dehydrating agent).

The amides or esters (as well as the free acids) which are finally obtained still contain a carbon to carbon double bond and may, therefore, be polymerized to produce high molecular weight products.

The agents of the invention may be used in any convenient manner for application to the fiber, thread or fabric. Preferably the agent is used in solution or emulsion form. Normally the agent is first pasted up in a solvent and aqueous alkali is then added in the desired amount. Such solution may be directly applied to the particular fiber, thread, or fabric being treated. If one wishes to do so, however, an emulsion may be made, for example, by the addition of a vinylacetate, a polyvinyl alcohol or Emulphor E, etc. Following is a typical solution of this type:

100 g. plastic soap
100 g. Cellosolve
15 cc. NaOH 50%
85 cc. water
300 g. solution of 33⅓% strength The composition in this form may then be applied to a fabric in the same manner in which softeners, lubricants, penetrants, rewetting agents, etc., are utilized. Also, the agents may be applied to the desired fibers or threads by passing such fibers or threads through a trough containing a solution of the agent in the desired concentration. A concentration of 10% by weight of the agent has been found to be particularly desirable for this purpose. By permitting the fiber or thread to pass through the trough at a rate of approximately 300 feet per minute, no drying is usually necessary because of the fact that the moisture content of the thread is extremely low.

The agents of the invention are equally applicable in textile wet-twisting operations where only water is normally used. By including the agents in the water, the resulting materials show improved ability to hold the twist and to strengthen the yarn. The present invention is particularly applicable for improving the characteristics, especially with respect to tensile strength, of cotton. However, it may also be applied, for the same purpose, to modify cellulosic fibers and fabrics, such as rayons formed by the cuprammonium or viscose process or the cellulose acetates. It is, furthermore, applicable for this purpose to other natural materials, such as wool and silk. Moreover, it may be applied to any of the other synthetic fibres and fabrics such as the nylons, Dacrons, etc.

The following examples are illustrative of the invention which is of course by no means limited thereto.

*Example 1*

120 g. abietic acid is dissolved in 240 g. dimethyl aniline. The acid is added portionwise with stirring and external cooling means are used to maintain the temperature at about room temperature. After all of the acid has been added, the reaction mixture is stirred for about 2 hours to complete formation of the Diels-Alder condensate. The product is isolated and dried and is then sulfonated by treatment with oleum at about 50° C. A 30 g. portion of ethylamine is dissolved in 120 g. dimethylaniline. To it is added the sulfonated Diels-Alder condensate and the resulting mixture is kept at 15° C. for about 10 hours with small portions of the amide of the Diels-Alder condensate being formed. [Substitution of 30 g. ethanol for the ethylamine with condensation at about 70° C. will yield the corresponding ester.]

*Example 2*

The procedures of Example 1 are followed except that about 15 g. phosphorus trichloride is added to the dimethyl aniline solution to obtain the same products in high yield.

Example 3

60 g. abietic acid is dissolved in about 250 ml. para-xylene and 100 g. 4-dimethylamino benzene sulfonic acid and 2 g. phosphorus pentachloride are added to the solution. The resulting solution is stirred and allowed to react at room temperature for about 2 hours to complete formation of the Diels-Alder condensate. 30 g. piperidine is added to the reaction mixture which is then refluxed for about 1 hour to obtain the amide of the sulfonated Diels-Alder condensate.

Example 4

The procedure of Example 3 is followed except that the equivalent molar amount of methyl taurine is substituted for the piperidine of the reference example.

Example 5

The procedure of Example 1 is followed except that an equivalent amount of methyl aniline is substituted for the dimethyl aniline of the reference example. The corresponding product is obtained.

Example 6

A mixture of 300 g. abietic acid and 260 g. sulfanilic acid are slurried up in 500 g. of toluol. With agitation and cooling, 4 g. $P_2O_5$ are added. The temperature is held at 40° C. for 6 hours, and then the mixture is heated to distill off the toluol under vacuum at 50° C. When all of the toluol has distilled off, the mass is cooled down. The mixture is converted to an alkaline paste.

Example 7

60 g. abietic acid is dissolved in 300 g. diethanolamine. 10 g. $PCl_3$ is added to the solution with cooling and the reaction mixture is then heated to 65° C. and held there for 4 hours. The resulting amide is isolated from the excess diethanolamine and dissolved in 300 g. diethylaniline. 2 g. trichloracetic acid is added to catalyze the reaction. The temperature is kept at 40° C. for 4 hours, then the diethylaniline is distilled off under reduced pressure at 60° C. Methanol is added and the solution is hydrogenated catalytically with Raney nickel to stabilize the compound by saturation of the C=C double bond resulting from the Diels-Alder condensation.

Example 8

40 g. dimethylaniline and 100 g. abietic acid are dissolved in 300 g. methanol. The mixture is allowed to react for 4 hours at 50° C. Raney nickel is then added and hydrogen is passed through the solution until ⅓ mol $H_2$ has been absorbed.

(A) The compound is isolated for use or
(B) Condensed with an amine or alcohol as follows: The condensed and hydrogenated Diels-Alder compound is mixed with 100 g. morpholine, heated to reflux and refluxed for 10 hours at 130° C. The excess morpholine is then distilled off. The resulting amide has no water solubilizing group, but can be emulsified according to standard procedures and can be applied as an emulsion spray on fibers or as an emulsion bath, where such application is feasible.

Example 9

100 g. abietic acid are dissolved in 200 g. ethyl alcohol. 20 g. of $P_2O_5$ are added slowly at the reflux temperature of the ethyl alcohol. When the esterification is completed the reaction mixture is cooled to 50° C. [the reaction mixture is no longer soluble in dilute caustic] and ⅓ mol diethyl-p-toluidine is added. The resulting mixture is agitated for 4 hours at 50° C. The resulting ethylester of the Diels-Alder compound can now be used for low temperature re-esterification with suitable amine or alcohols as follows: To the above mixture is added ⅓ mol oleyl alcohol sulfonic acid; the mixture is refluxed and the ethanol is allowed to distill off at 80° C. to form the ester of the oleyl alcohol. The resulting ester of the oleyl alcohol is ready to use. Alternatively ⅓ mol. diethanolamine is added to the above mixture and reaction is permitted to take place at room temperature for at least 4 hours. The resulting amide of the diethanolamine is then ready for use.

This invention may be variously otherwise embodied within the scope of the appended claim.

We claim:

High tensile strength threads, fibers and fabrics carrying a strengthening agent comprising a condensation product of abietic acid and a sulfonated amine.

References Cited in the file of this patent

UNITED STATES PATENTS

| | | |
|---|---|---|
| Re. 19,612 | Koch | June 18, 1935 |
| 2,004,297 | Seymour | July 11, 1935 |
| 2,260,384 | Kritchevsky | Oct. 28, 1941 |
| 2,441,231 | Yolles | May 11, 1948 |
| 2,450,706 | Zeiss | Oct. 5, 1948 |
| 2,472,437 | Pratt | June 7, 1949 |
| 2,564,634 | Beard | Aug. 14, 1951 |
| 2,750,365 | Subluskey | June 12, 1956 |

OTHER REFERENCES

Junior American Chemical Society, vol. 60, #11 (November 1938), pages 2631 and 2636. Class. 260–97.